(12) United States Patent
Draganov et al.

(10) Patent No.: US 8,406,280 B2
(45) Date of Patent: Mar. 26, 2013

(54) SYSTEM AND METHOD FOR MITIGATING SEVERE MULTIPATH INTERFERENCE FOR GEOLOCATION AND NAVIGATION

(75) Inventors: Alexandr Draganov, Reston, VA (US); Franklin M. Haas, Jr., Hamilton, VA (US); Marc A. Harlacher, Herndon, VA (US)

(73) Assignee: Argon ST, Inc., Fairfax, VA (US)

( * ) Notice: Subject to any disclaimer, the term of this patent is extended or adjusted under 35 U.S.C. 154(b) by 1038 days.

(21) Appl. No.: 12/406,456

(22) Filed: Mar. 18, 2009

(65) Prior Publication Data

US 2013/0051434 A1 Feb. 28, 2013

Related U.S. Application Data

(60) Provisional application No. 61/064,643, filed on Mar. 18, 2008.

(51) Int. Cl.
*H04B 1/00* (2006.01)
*G01S 1/00* (2006.01)
(52) U.S. Cl. ........... 375/150; 342/350; 701/478.5
(58) Field of Classification Search .......... 375/150, 375/347, E01.002; 455/137
See application file for complete search history.

(56) References Cited

U.S. PATENT DOCUMENTS

| | | | | |
|---|---|---|---|---|
| 3,984,068 A * | 10/1976 | McPhee | 244/3.19 |
| 4,005,421 A * | 1/1977 | Dax | 342/148 |
| 4,034,370 A * | 7/1977 | Mims | 342/25 D |
| 4,894,662 A * | 1/1990 | Counselman | 342/357.25 |
| 4,975,704 A * | 12/1990 | Gabriel et al. | 342/25 C |
| 5,243,349 A * | 9/1993 | Mims | 342/25 A |
| 5,708,436 A * | 1/1998 | Loiz et al. | 342/25 A |
| 5,973,643 A * | 10/1999 | Hawkes et al. | 342/457 |
| 6,031,882 A * | 2/2000 | Enge et al. | 375/343 |
| 6,141,393 A * | 10/2000 | Thomas et al. | 375/347 |
| 6,144,316 A * | 11/2000 | Skinner | 340/853.7 |
| 6,249,542 B1 * | 6/2001 | Kohli et al. | 375/150 |
| 6,347,264 B2 * | 2/2002 | Nicosia et al. | 701/16 |
| 6,463,091 B1 * | 10/2002 | Zhodzicshsky et al. | 375/149 |
| 6,466,612 B2 * | 10/2002 | Kohli et al. | 375/150 |
| 6,516,021 B1 * | 2/2003 | Abbott et al. | 375/150 |
| 6,553,396 B1 * | 4/2003 | Fukuhara et al. | 708/313 |
| 6,628,844 B1 * | 9/2003 | Benitz | 382/276 |
| 6,630,904 B2 * | 10/2003 | Gustafson et al. | 342/357.59 |
| 6,633,814 B2 * | 10/2003 | Kohli et al. | 701/466 |
| 6,731,182 B2 * | 5/2004 | Sakurai | 331/177 V |
| 6,911,931 B2 * | 6/2005 | Vincent | 342/25 C |
| 6,952,440 B1 * | 10/2005 | Underbrink | 375/150 |
| 6,975,607 B2 * | 12/2005 | Sekine et al. | 370/331 |
| 7,030,814 B2 * | 4/2006 | Stone et al. | 342/451 |
| 7,068,742 B2 * | 6/2006 | Yousef et al. | 375/343 |
| 7,106,243 B2 * | 9/2006 | Krikorian et al. | 342/25 B |
| 7,110,432 B2 * | 9/2006 | Hooton | 375/139 |
| 7,139,307 B2 * | 11/2006 | Takahashi | 375/148 |
| 7,145,496 B2 * | 12/2006 | Cho et al. | 342/25 R |
| 7,301,992 B2 * | 11/2007 | Kohli et al. | 375/150 |
| 7,388,541 B1 * | 6/2008 | Yang | 342/464 |
| 7,440,493 B2 * | 10/2008 | Pietila et al. | 375/150 |

(Continued)

OTHER PUBLICATIONS

Lal C. Godara, "Application of Antenna Arrays to Mobile Communications, Part II: Beam-Forming and Direction-of-Arrival Considerations", Proceedings of the IEEE, vol. 85, No. 8, Aug. 1997.*

*Primary Examiner* — David C. Payne
*Assistant Examiner* — Bahman Badipour
(74) *Attorney, Agent, or Firm* — Armstrong Teasdale, LLP

(57) ABSTRACT

A system and method for mitigating multipath interference of signals in environments to determine the line of sight signal propagation.

16 Claims, 7 Drawing Sheets

U.S. PATENT DOCUMENTS

| | | | | |
|---|---|---|---|---|
| 7,453,961 B1* | 11/2008 | Li et al. | | 375/343 |
| 7,782,710 B1* | 8/2010 | Uzes | | 367/135 |
| 7,808,884 B2* | 10/2010 | Jitsukawa et al. | | 370/208 |
| 7,844,397 B2* | 11/2010 | Lund et al. | | 701/470 |
| 7,855,678 B2* | 12/2010 | Scherzinger et al. | | 342/357.23 |
| 7,860,014 B2* | 12/2010 | Takano | | 370/241 |
| 7,869,487 B2* | 1/2011 | Gilmour et al. | | 375/148 |
| 7,872,583 B1* | 1/2011 | Yushkov et al. | | 340/572.1 |
| 7,969,311 B2* | 6/2011 | Markhovsky et al. | | 340/572.1 |
| 8,059,700 B2* | 11/2011 | Lopez-Risueno et al. | | 375/150 |
| 8,116,394 B2* | 2/2012 | Jia | | 375/260 |
| 2002/0001339 A1* | 1/2002 | Dooley et al. | | 375/150 |
| 2002/0154614 A1* | 10/2002 | Jagger et al. | | 370/332 |
| 2003/0054845 A1* | 3/2003 | Krasny et al. | | 455/506 |
| 2003/0132879 A1* | 7/2003 | Dooley et al. | | 342/357.09 |
| 2003/0142639 A1* | 7/2003 | Cheung et al. | | 370/321 |
| 2003/0227962 A1* | 12/2003 | Hintz-Madsen | | 375/148 |
| 2004/0052305 A1* | 3/2004 | Olson et al. | | 375/148 |
| 2004/0218701 A1* | 11/2004 | Singh et al. | | 375/350 |
| 2006/0193298 A1* | 8/2006 | Kishigami et al. | | 370/338 |
| 2006/0209974 A1* | 9/2006 | Yoshida | | 375/260 |
| 2007/0211791 A1* | 9/2007 | Ganguly et al. | | 375/148 |
| 2007/0237269 A1* | 10/2007 | Lillo et al. | | 375/343 |
| 2007/0263738 A1* | 11/2007 | Jitsukawa et al. | | 375/260 |
| 2008/0063043 A1* | 3/2008 | Xia et al. | | 375/233 |
| 2008/0129598 A1* | 6/2008 | Godefroy et al. | | 342/450 |
| 2008/0174483 A1* | 7/2008 | Bryant et al. | | 342/357.06 |
| 2008/0211912 A1* | 9/2008 | Greenfeld et al. | | 348/144 |
| 2008/0234930 A1* | 9/2008 | Cheok et al. | | 701/207 |
| 2008/0238772 A1* | 10/2008 | Soloviev et al. | | 342/357.14 |
| 2008/0284646 A1* | 11/2008 | Walley et al. | | 342/357.09 |
| 2008/0291086 A1* | 11/2008 | Walley et al. | | 342/367 |
| 2008/0291981 A1* | 11/2008 | Jonsson et al. | | 375/148 |
| 2009/0028221 A1* | 1/2009 | Sahinoglu et al. | | 375/138 |
| 2009/0102711 A1* | 4/2009 | Elwell et al. | | 342/357.06 |
| 2009/0219202 A1* | 9/2009 | Pon | | 342/357.12 |
| 2009/0323642 A1* | 12/2009 | Tanno et al. | | 370/336 |
| 2010/0103989 A1* | 4/2010 | Smith et al. | | 375/150 |
| 2010/0211316 A1* | 8/2010 | Da Silva et al. | | 701/216 |
| 2011/0256882 A1* | 10/2011 | Markhovsky et al. | | 455/456.1 |
| 2012/0076177 A1* | 3/2012 | Simic et al. | | 375/150 |

\* cited by examiner

SYSTEM AND METHOD FOR MITIGATING SEVERE MULTIPATH INTERFERENCE FOR GEOLOCATION AND NAVIGATION

This application claims the priority of U.S. Provisional Patent Application No. 61/064,643 filed Mar. 18, 2008, the disclosure of which is incorporated herein by reference.

The U.S. Government has a paid-up license in this invention and the right in limited circumstances to require the patent owner to license others on reasonable terms as provided for by the terms of Contract No. W15P7T-07-C-P204 awarded by The Defense Advanced Research Projects Agency.

The U.S. Government has a paid-up license in this invention and the right in limited circumstances to require the patent owner to license others on reasonable terms as provided for the terms of [Contract NO] awarded by {Agency name]

BACKGROUND

Technologies for personal and vehicular navigation are rapidly developing due to the availability of Global Navigation Satellite Systems (GNSS) such as the United States' Global Positioning System (GPS), the Russian GLONASS system, and the European Galileo system. These systems however are designed for environments where a clear line of sight (LOS) exists between the user receiver and the GNSS satellites. Using trilateration methods, a user can convert the ranging measurement obtained from the LOS signal into an estimate of the user's position.

Indoor and urban canyon navigation presents two main challenges for GNSS: low signal strength and severe multipath interference. Assisted GPS (ALPS) and Ultra-Tight Coupling (UTC) are current methods for tracking weak signals in the GNSS receiver operating environment. Although there are several existing techniques for mitigating multipath interference, these known techniques are not effective to adequately mitigate the multipath in the indoor and urban environments. Multipath interference exists when a receiver receives signals reflected from nearby terrain or structures, such as buildings or walls. The received multipath signal is commonly referred to as a non-line of sight (NLOS) signal. Multipath signals always arrive "late" compared to the LOS signal, thus creating an error in the measured range and corrupting the user position estimate. This problem is especially acute indoors and in urban canyons, due to multiple reflection-generating objects which surround a user (building walls, furniture, cars, etc.).

There are several known methods to mitigate multipath, but these methods help only in relatively benign multipath environments. For example, if the strength of multipath signals is not large compared to the strength of the LOS signal, and multipath delays are not too small, narrow correlators, strobe correlators and similar methods may be used to effectively isolate or remove the multipath signals. However, these techniques are effective only if the multipath delays are on the order of or larger than the inverse signal bandwidth, e.g., at least 0.1 chip length, which is 30 meters for GPS civilian signal. However, in the indoor and urban environment, there are many multipath-generating surfaces at distances smaller than 30 meters, which makes these techniques not effective for those environments.

Another known technique for multipath mitigation is called "Multipath Estimation Delay Lock Loop" (MEDLL) from NovaTel, Inc. in Calgary Alberta, Canada, A MEDLL receiver has many correlators which integrate the satellite signal at different delays (compared to typically three correlators for a traditional receiver) against the known code of the transmitted signal. The result is a profile of a GNSS satellite signal's correlation with the code replica, sampled at an array of points. LOS and all multipath components contribute to this profile, forming a complex signature. The MEDLL can discriminate the individual signal components, thus can be used to isolate LOS from multipath. This method is effective if there are few dominant signal components, and if one of the dominant components is the LOS signal. If there are many multipath components and/or if LOS is not present or weak, the MEDLL receiver does not yield a reliable LOS measurement.

SUMMARY

The present disclosure presents novel and advantageous systems and methods for discriminating between LOS and NLOS signal paths in a radio frequency (RF) receiver such as a GNSS navigation receiver. In one aspect, the present disclosure provides for a method referred to as Synthetic Aperture Line of Sight Assessment, or SALSA. The SALSA method uses the direction of arrival for a signal to discriminate between LOS and NLOS and is especially beneficial in environments where the amplitude of the multipath signals exceeds that of the LOS signal, and where the multipath delays are within the inverse of the signal bandwidth.

In another aspect, the present disclosure provides for a method referred to as Genetic Algorithm for Multipath Elimination, or GAME. The GAME method identifies and isolates signals that have been incorrectly identified as LOS signals. For a user navigating in urban or indoor environment, some LOS signals may be completely blocked by building walls, etc. Thus, there is no guarantee that a pseudorange measurement is not corrupted by the multipath, even if the most sophisticated algorithms and hardware is used for processing each signal. Therefore, one needs to have a method to identify LOS paths among received signals. If there are multiple signals received, then it is possible to check the consistency of several measurements to find if any of them are corrupted. For example, RAIM (Receiver Autonomous Integrity Monitoring) is often used to find if there is one faulty measurement in a set, e.g. due to a GPS satellite failure. In the case of urban and indoor navigation, there may be multiple faulty (biased) measurements at each epoch, and the partition between biased and non-biased measurements may change from one epoch to another due to user motion. Thus, the algorithm to identify biased measurements must be able to react to changes in the measurements at a rapid pace, and must be able to identify multiple faults at each epoch. GAME is designed to serve this purpose.

The SALSA and GAME methods are complementary and are designed to extract a LOS measurement in a multipath environment if the LOS signal is present and if the user is moving, or if a signal is received over time. SALSA and GAME may also be used to support Direction Finding algorithms for emitter geolocation.

In another aspect, the present disclosure provides for a method referred to as Weighted Average Functionality For Limiting Error Sources ("WAFFLES.") WAFFLES uses linear combinations of TDOA measurements in such way, that it largely cancels effects of timing, calibration, and geolocation errors. An alternative and complementary navigation method to GPS means is the use of various terrestrial signals rather than GPS signals. For example, signals for digital TV, from cell phone base stations, and Wi-Fi stations can be used to navigate in the areas where such signals are available. Since these signals are not designed for navigation, they lack several important navigation features, most importantly, accurate timing. This makes it necessary to use reference stations to timestamp signal features. Information about timestamps can be transmitted to the user via a communication channel. By comparing timing of the same features received by the user equipment with that at the reference station, the user can form a TDOA measurement, which can be used for navigation. One problem facing this concept is that location of signal sources is not always known with high accuracy. For example, location of a cell base tower may be obtained from original engineering drawings, but there is always a possibility that location data will have some inaccuracies. Errors in locating signal sources directly impact user navigation accuracy. Another problem deals with calibration and timing errors at the reference stations. TDOA at the user assumes that timing measurements at the reference stations are accurate. This may be not the case if calibration and synchronization of reference stations is inaccurate. These two problems are linked. Indeed, if data on location of the signal sources is not reliable, it may be possible to geolocate these signal sources using the same reference stations as those providing timing information to the user. However, any timing and calibration errors at the reference station will introduce errors in the source geolocation. Thus, TDOA measurements at the user will be impacted by timing and calibration errors in two ways: (1) directly, and (2) due to errors in source geolocation. WAFFLES addresses this problem by using linear combinations of TDOA measurements in such way, that it largely cancels effects of timing, calibration, and geolocation errors.

In another aspect, the present disclosure provides for a method of navigation in an environment where the navigation signals may be obstructed, referred to as LEAF. RF navigation under foliage presents its own set of challenges. The same may be true for some other complex environments, where signal propagation to the user is subject to diffused scattering. The earliest arrival of the signal is due to the direct signal component, and its measurement is the goal of the pseudorange estimate by the receiver. However, this component arrives at the receiver along with all scattered signal components, which cannot be separated from the direct component and which corrupt the pseudorange measurement.

The LEAF method is designed to estimate pseudorange using statistical assumptions about the propagation medium. Individual scatterers (e.g., leaves and twigs in the foliage) produce random phases and amplitudes of the signal at different delays; however statistical properties of the received signal are predictable and can be used. The method finds the most likely signal delay from correlation measurements obtained by an array of correlators.

DETAILED DESCRIPTION

SALSA

Determining the Direction of Arrival (DOA) of a signal is a useful method to discriminate LOS from multipath. The LOS signal generally comes from the direction of the transmitting satellite, while the multipath signals come from the direction of the reflector. The DOA discriminator is not constrained by assumptions of large delay and relatively weak multipath. Traditional methods for separating signals by DOA require an antenna array. Of course, it is not always practical for a user to carry an antenna array. In the mobile receiver environment, it is desirable to use a small, one-element omni-directional antenna. The present disclosure describes a method for using an omni-directional antenna for DOA by utilizing an antenna array processing effect created by exploiting user motion to synthesize the array aperture.

Figure 1:
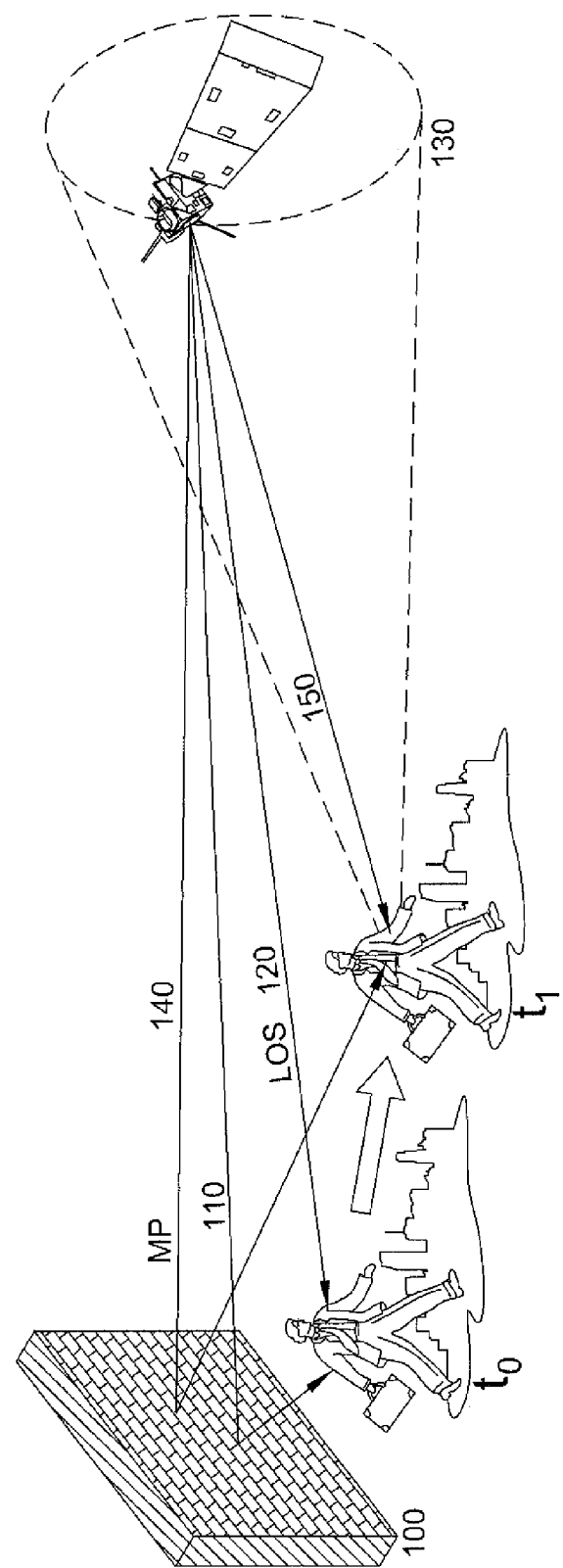
FIG. 1 is a simplified pictorial representation of a multipath signal environment.

With reference to FIG. 1, a walking user 100 moves at the speed of approximately 2 m/s beginning at time $t_0$. At time $t_0$, user 100 may receive a multipath signal 110 and a LOS signal 120 from GNSS transmitting satellite 130. At time $t_1$, the user position has changed by many wavelengths (e.g., wavelength of the GPS L1 frequency is 19 cm), and may receive a multipath signal 140 and a LOS signal 150 from satellite 130. In one aspect of the present disclosure, a receiver will process the received signals at times $t_0$ and $t_1$ (and at additional times $t_n$) to separate LOS from multipath and, in effect, create a large synthetic aperture array. In the case of a user in a vehicle traveling at an increased speed, the resulting synthetic aperture array will be larger.

In SALSA operation, a GNSS receiver can correlate an incoming satellite signal with a known code replica to determine complex (I and Q) correlations. Each correlation requires integrating over some period of time, $\Box t$. This time interval is referred to in this disclosure as a sub epoch. A bank of N correlators, each having an equally spaced code delay, produces N correlation measurements for each sub epoch. The receiver accumulates correlation measurements from multiple sub epochs over each epoch T. Thus, by the end of the epoch, there is a two-dimensional array of correlations, where one dimension is the code delay, and another dimension is time (sub epoch).

For example, consider a simple case when the user with a receiver moves with a constant velocity during an epoch (this means at a constant speed and along a straight line). Since LOS and multipath signals transmitted by the transmitter arrive at the user from different directions, they will have different rates of phase change at the receiver as illustrated in FIG. 2.

Figure 2:
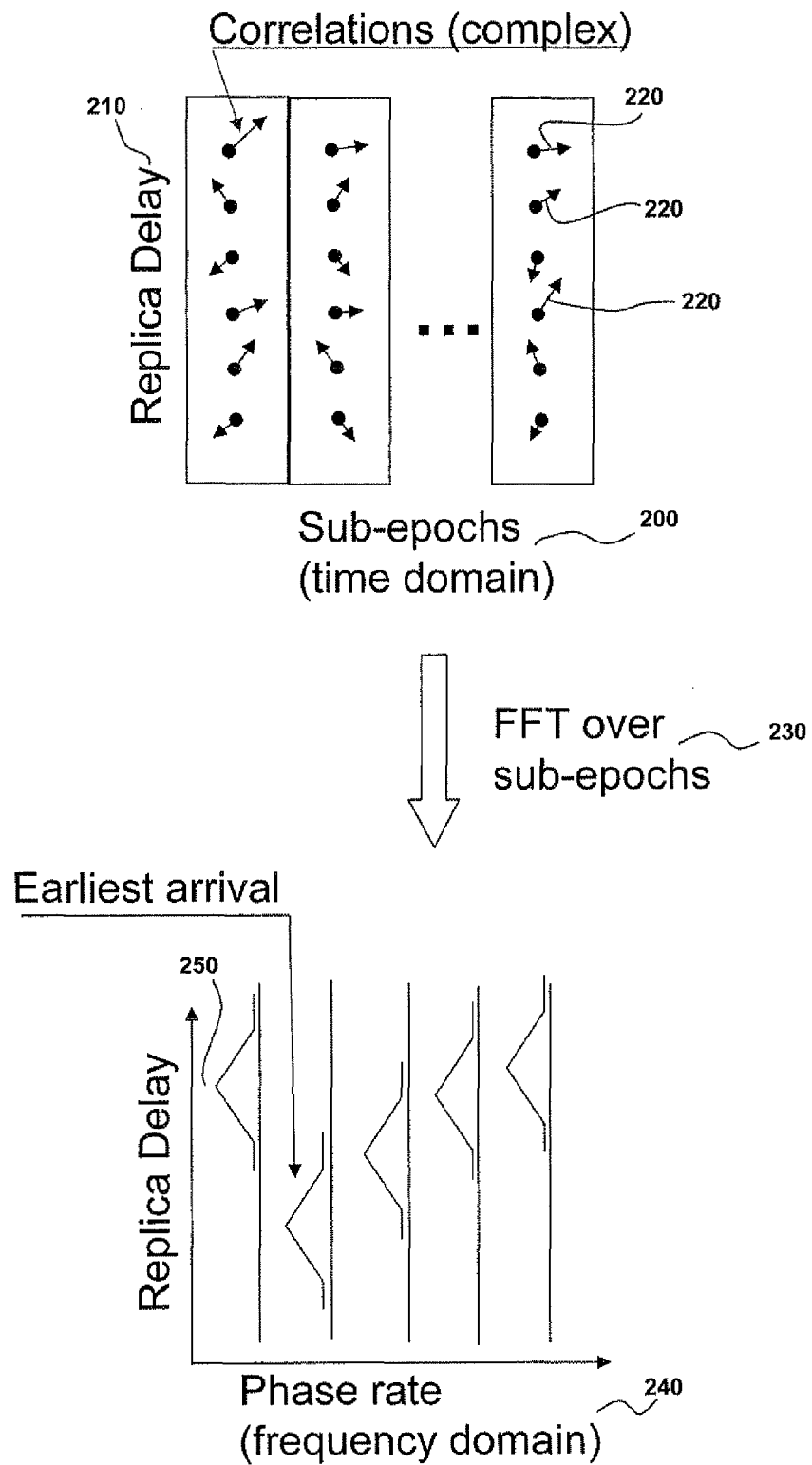
FIG. 2 is a simplified pictorial representation of signal correlations in a multipath environment.

FIG. 2 is a simplified pictorial representation of signal correlations in a multipath environment. Signal correlations are measured in two dimensions: at different time instances (sub-epochs) 200 as well as at different delays of signal replica 210. The top portion of the figure illustrates a two-dimensional matrix of resulting complex correlations, each represented with an arrow 220. A spectral analysis algorithm 230 transforms the time domain into the frequency domain 240. As a result, signals reaching the receiver via different paths become separated, and each path exhibits a maximum correlation at a particular delay, shown as a tip of a triangle 250. The earliest arrival is likely to be the line-of-sight.

If a Fourier transform is performed in the time domain (across sub epochs) for each replica delay, different paths will show in different phase rate bins. In this example, signal paths can be separated by their Doppler rates. For each phase rate bin, there may still be some correlation profile in the replica delay domain that may be due to relatively few paths which have the corresponding phase rate (e.g., arrive from approximately the same corresponding direction). However, only a few paths will contribute to a particular phase rate bin, and therefore these paths can be resolved by some conventional techniques, such as MEDLL. The result of this procedure will be multiple, separately identified paths, each with its own phase rate and delay. The earliest path (smallest delay) is a candidate for the LOS.

In real world applications, a user may not move with a constant velocity and along a straight line. The disclosed methods can be applied to any trajectory if the LOS components are added coherently, and multipath components are added destructively. This can be done if the relative trajectory is approximately known during the epoch, which generally requires using an inertial measuring unit (IMU). In this case, the correlation phases for each correlation measurement may be rotated in such a way that LOS components should have the same phase. This step will be referred to as motion compensation.

After the correlation phases have been motion compensated, a simple way to isolate the LOS is to sum correlations over all sub epochs for each replica delay. In a motion-compensated frame, LOS corresponds to the zero phase rate (user "standing still" in the framework tied to the user) and the Fourier transform at the zero phase rate is the same as integration over time. This example, though not an optimal implementation, shows that SALSA has some similarities with integration.

There are several primary benefits of doing SALSA as compared to the plain long signal integration. First, SALSA accounts for imperfections in motion compensation. In an ideal case, having an accurate estimate of relative user trajectory during the epoch from an inertial measuring unit (IMU), and an accurate internal clock, perfect motion compensation would be possible, and the LOS component is guaranteed to be in the zero phase rate bin. In this idealized case, integration would achieve the same result as the Fourier transform. However, the estimate of the user trajectory is imperfect, and the user clock has a drift. In this realistic case, the true signature of the LOS may appear not in the zero phase rate bin, but somewhere in its vicinity, and a Fourier transform may be used to find it.

Second, the position of the LOS-induced maximum in the phase rate domain is an indication of the errors in the clock drift and trajectory estimate. In essence, it is the phase rate residual. When multiplied by the epoch duration, it becomes the residual in ADR (accumulated delta range), which is a valuable measurement in itself, commonly used by many navigation systems.

Third, SALSA assists in isolating the LOS component from multipath. Some multipath components may be located in phase rate bins which are poorly separated from the location of the LOS bin. Each component will show up as a maximum in the phase rate (Fourier) domain. If maxima are not well separated, a tail of one maximum may contaminate a measurement for another maximum. A plain time-integration ignores this effect, and suffers from multipath correlations "leaking into" the integration result. SALSA uses windowing (e.g., Kaiser-Bessel window) to improve path separation.

Fourth, SALSA may be used with beamforming and direction finding to improve isolation of the LOS signal. Each path contributes a spectral peak in the phase rate (Fourier) domain. To find and isolate a particular peak, such as that for LOS, there are many sophisticated methods to do so in the beamforming and direction-finding (DF) technologies, examples include MUSIC, Maximum Entropy Methods, and weighted subspace fitting. By re-casting a navigation problem in synthetic aperture terms, the entire arsenal of beamforming and DF techniques can be used with the SALSA method.

SALSA Music

In another aspect of the present disclosure, SALSA uses a modified version of the MUSIC algorithm to analyze correlations across RF channels and delays, and thus does not require user motion.

In mathematical terms, A matrix C* can be formed $$C^* = \begin{pmatrix} 1 & c_1 & \ldots & c_n & & 0 \\ & \ddots & \ddots & & \ddots & \\ 0 & & 1 & c_1 & \ldots & c_n \end{pmatrix}, \quad (m-n) \times m \quad [1]$$

where m is the number of elements in the array, and n is the rank of the signal subspace (i.e., number of spectral components we are looking for). Coefficients $c_1$ are unknowns and will be solved for.

Let $S=[s_1, \ldots, s_n]$, m×n be a matrix formed by eigenvectors of the signal correlation matrix. Then it can be shown that $$C^*S=0. \quad [2]$$

Terms in this matrix equation can be re-arranged to rewrite it in the form:

$$\phi c = \mu \quad [3]$$

where the (m−n)n×n matrix $\phi$ and the (m−n)n×1 vector $\mu$ are entirely determined from the elements of S, and where $c=[c_1, \ldots, c_n]$. If the sample version of S is used, then c can be treated as unknowns in a linear (over-determined) system of equations and can be solved for.

Next, a polynomial can be formed $$A(z)=1+c_1 z^{-1}+\ldots+c_n z^{-n}. \quad [4]$$

Roots of that polynomial for $z^{-1}$ happen to correspond to components of the signal:

$$A(z) = \sum_{k=1}^{n} (1 - e^{i\omega_k} z^{-1}). \quad [5]$$

Although it may appear convoluted, it is recognized that this method works for correlated and for coherent signals, i.e. assumption of signal independence is not necessary.

The above algorithms are known and discussed in *Spectral Analysis of Signals*, P. Stoica and R. Moses, 2005.

The present disclosure adapts these algorithms for use in the specific application. In the present disclosure, all signals (LOS and multipaths) come ultimately from the same source. Thus, all signals are fully coherent. This is a somewhat extreme case, and the mathematical treatment for this case follows.

First, with respect to a signal correlation matrix, for any pair of array elements, the corresponding element of the correlation matrix is defined as:

$$M_{ij}=E\{y_i y_j^*\}. \quad [6]$$

Signal samples $y_i$ are a sum of multiple signal components. In the case of fully coherent signal components, all components (except noise) vary by the same phase with time, and therefore $$E\{y_i y_j^*\}=y_i y_j^*. \quad [7]$$

In other words, averaging over time does not do any good for fully coherent signals. This has big implications. It is easy to check by direct substitution that for any vector $\vec{x}$ $$M\vec{x} = g\vec{y} \quad [8]$$

where g is a constant. Thus, matrix M projects any vector on vector $\vec{y}$, which means that M has only one non-zero eigenvector, which is $\vec{y}$. (If there is noise, there will be noise space eigenvectors, but the present disclosure is concerned with the signal space.)

This totally invalidates the traditional MUSIC method. However, with the modified MUSIC method presented above, the l-th equation in the system of equations (2), becomes greatly simplified by the fact that there is only one non-zero eigenvector and therefore only one column in matrix S:

$$(C*S)_l = \sum_{q=0}^{n} c_q y_{q+l} = 0 \quad [9]$$

where notation $c_0=1$ is used for brevity. This assumes that samples $y_l$ comprise n signal components arriving from different directions. If there is a uniform linear array (ULA), then $$y_j = \sum_{k=0}^{n-1} a_k e^{i\omega_k j}. \text{ Then} \quad [10]$$

$$(C*S)_l = \sum_{q=0}^{n} c_q \sum_{k=0}^{n-1} a_k e^{i\omega_k(q+l)} = 0. \quad [11]$$

Changing the order of summation to get:

$$(C*S)_l = \sum_{k=0}^{n-1} a_k e^{i\omega_k l} \sum_{q=0}^{n} c_q e^{i\omega_k q} = 0. \quad [12]$$

Equations [12] for different l form a linear system with linearly independent coefficients $a_k e^{i\omega_k l}$. Thus, they can only be satisfied if $$\sum_{q=0}^{n} c_q e^{i\omega_k q} = 0 \quad [13]$$

for any value of k.

Denoting $e^{i\omega_k} = \zeta_k$, then [13] is a polynomial for $\zeta_k$ which must have n roots. Since the zero-order term is 1 (see definition of $c_q$), equations [13] can be rewritten in the form:

$$\prod_{\kappa=1}^{n} (1 - b_\kappa \zeta_\kappa) = 0 \quad [14]$$

where $b_k$ are defined via roots of polynomial [13]. Equation [14] must hold for any k, which means that $b_k$ are simply $\zeta_k^{-1}$ (not necessarily in the same order).

Thus, the method can be summarized as follows:
1. Get samples $y_l$. Average them over time to decrease noise.
2. Form equations $$\sum_{q=0}^{n} c_q y_{q+l} = 0$$

and solve them for $c_q$. Assume $c_0=1$.
3. Find roots of the polynomial, which has $c_q$ for coefficients.
4. Roots will be equal to $e^{-i\omega_k}$ where $\omega k$ defines a direction of arrival for the k-th signal components in a ULA.

It is not necessary to find eigenvectors, which is good in terms of simplicity and computational efficiency.

Figure 3:
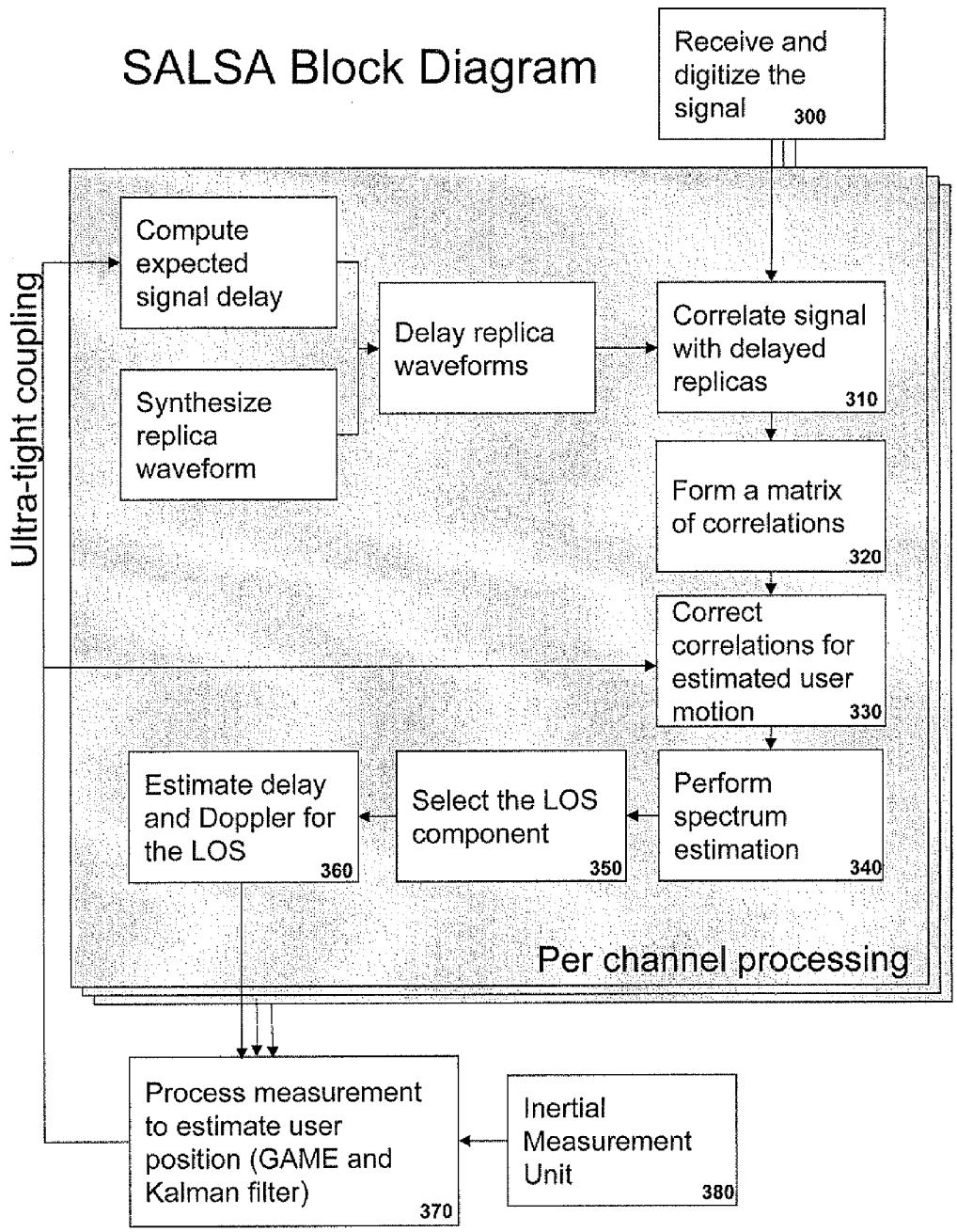
FIG. 3 is a simplified flow diagram of one embodiment of the Synthetic Aperture Line of Sight Assessment (SALSA) method.

With reference to FIG. 3, the use of one embodiment of the SALSA method is disclosed. A receiver receives and digitizes an RF signal 300. For each receiver channel, the following sub-steps are performed:

(a) The received signal 300 is correlated with a replica waveform using a bank of correlators 310 with the following characteristics:
  (1) each correlator is placed at a different delay;
  (2) the correlator delays are computed using the estimated user position, user clock error, satellite clock error and satellite position (this is known as ultra-tight coupling in integrated GPS-INS systems), and account for the LOS propagation;
  (3) the delays are set in such a way that the expected LOS signal has non-zero correlations with at least some replicas; and
  (4) the correlations are estimated at regular time intervals (sub-epochs).

(b) With the data generated above and illustrated ("Correlations (complex)" in FIG. 2), a two-dimensional matrix of correlations 320 is formed with the following characteristics:
  (1) one dimension is the sub-epochs, and the other dimension is delay; and
  (2) the 2D matrix represents measurements at a single epoch.

(c) using the navigation estimate of the user trajectory, the 2D correlation matrix is corrected for the user motion 330 with the following process:
  (1) the phases of correlation measurements are rotated by an amount consistent with the user motion (the phase of correlation for the LOS signal will be static across sub-epochs after this correction); and
  (2) the correlation matrix is interpolated in the delay domain to compensate for changes of the delay from one epoch to another;

(d) A spectrum estimation algorithm 340 is applied in the time domain to the correlation matrix to separate out the different signal paths by direction of arrival (shown in FIG. 2 as "FFT over sub-epochs"). Example spectrum estimation algorithms include windowing and Fourier transform, principal component analysis, singular spectrum analysis, maximum entropy method, MUSIC method, and Modified MUSIC method. An example pictorial of the resultant Replica Delay-Phase rate plot, along with the observation of the earliest arriving signal path is shown in FIG. 2. In addition to the time domain, spectral estimation algorithms may also be applied to frequency and channel domains for additional multipath mitigation.

(e) The LOS path is selected 350 using one or more of the following criteria:
  (1) LOS is the earliest arriving path;
  (2) LOS is the slowest varying principal component; and
  (3) LOS corresponds to a nearly zero phase rate in the Fourier domain.
(f) The pseudorange (PR) delay and Doppler for the LOS component are estimated 360.

The PR and Doppler measurements are used to estimate user position using standard navigation techniques such as Kalman filtering 370. High-rate IMU data 380 can be used to augment the measurements in the navigation filter 370.

Modified MUSIC Implementation for a Multi-channel Signal

The SALSA MUSIC method is based on two observations. First, isolating LOS and multipaths in a multi-channel signal (such as OFDM) by a moving user is mathematically equivalent to the problem of spectral estimation in two dimensions. The first dimension is the time domain, and the second dimension is the channel domain. Second, the conventional MUSIC algorithm does not work well for the problem at hand, because LOS and multipath signals are highly correlated (basically, fully correlated). However, the modified MUSIC algorithm works.

In one embodiment, the SALSA MUSIC method can be summarized as follows:

1. Each frequency channel is tracked and demodulated individually. The replica signal for each channel is correlated with the incoming signal to obtain I and Q measurements (complex correlations). This creates a 2D matrix of data (number of sub-epochs×number of frequency channels complex values).

2. A reference station supplies its own measurements of the complex amplitude for each channel. The user rotates/scales measurements to compensate for any clock drifts at the signal source and for any variations in amplitude (e.g., due to power control at the signal source).

3. Using the estimated user position, the algorithm corrects for the user motion, which means that phases of measurements are rotated.

4. The Modified MUSIC algorithm is applied to one channel (the middle one) in the 2D matrix of the data. This algorithm determines the spectrum (which can be mapped to the directions of arrival for different paths in the synthetic aperture array). The algorithm finds a fixed number of paths, regardless of the true number of paths in the data. For example, it may look for N-10 paths. If the RF propagation channel contain fewer than 10 paths, the algorithm will find spurious paths (described below); if the RF propagation channel contains more than 10 paths, some weaker ones will not be found.

5. Note that if the multipath environment contains two parallel walls, then reflections from these walls will have the same DOA but different delays. This is just one example, which shows that it is not enough to resolve DOAs to isolate every path. The second dimension should be considered. Next, the algorithm loops over the N paths, which were found in the DOA domain:
  a. For the current path in the loop, it treats that path as a signal and all other paths as interference. It computes beamforming weights, which maximize the gain in the direction of the current path, while placing nulls in the directions of the other N−1 paths. These beamforming weights are applied to data from all frequency channels.
  b. The result of the previous step is M complex numbers, which are in the channel domain. Modified MUSIC is applied again, this time in the channel domain. Fewer paths are now sought for two reasons. First, time domain/DOA analysis has separated many paths already, and for this particular DOA there should be one or at most few paths left, which were not resolved. Second, having only M measurements, we would not be able to find many paths anyway. The algorithm currently looks for K paths.
  c. For each of the K paths, the algorithm computes beamforming weights, places max gain on the current path and null on K−1 other paths.

6. The total result of all this computation is N×K path combinations (K paths found in the channel domain for each of the N paths in the time domain). Each combination has three important values associated with it:
  a. Spectral frequency in the time domain. This value is mapped to the delta range measurement residual for that path. (Or to DOA, if desired.)
  b. Spectral frequency in the channel domain. This value is mapped to the delay measurement residual for that path.
  c. Amplitude of the signal on that path, as computed by the beamforming. Note that beamforming is applied twice (in the DOA domain and then in the delay domain.)

7. The next task is to separate the seeds from the chaff, i.e. to eliminate spurious paths. The reasoning goes like this: if a beam is formed on the spurious path and all other paths are nulled (which includes all real paths) then the resulting amplitude of the signal will be relatively small. This applies to both stages of the beamforming. Thus, 30 path combinations are sorted by their amplitudes, and some in the bottom of the list are cut off.

8. Finally, the LOS path is selected. The selection is based on three criteria:
  a. Delay residual is not too large (within a configurable threshold)
  b. Delta range residual is not too large (within a configurable threshold)
  c. First arrival among those satisfying criteria a and b above.

Thus, in one aspect inertial measuring units (IMU) and UTC can be used to get multiple measurements for a single epoch. Multiple correlation measurements can be collected over one epoch, e.g. 100 measurements, separated by 10 ms are collected over one second. Rather than integrating or averaging these measurements (as it is done by techniques for long integration of GPS signals), measurements are processed as a set.

In another aspect, using data from the IMU and UTC, measurements are corrected for the user motion, in such way that for the LOS path the phase of the signal remains constant or changes linearly.

In another aspect array processing techniques are used to isolate paths. Array processing techniques are applied to the set of measurements to isolate individual signal paths. These techniques may include windowing and Fourier transform, principal component analysis, MUSIC and Modified MUSIC.

In yet another aspect, the paths can be cycled through and delays can be determined. With the knowledge of DOA for all paths reaching the receiver, the algorithm can apply beamforming to all or some of the paths and determines each path's delay. The beamforming can be performed using the following steps:
  a. Compute beamforming weights to put gain on the desired path (i.e., DOA) and/or nulls on other paths' DOA
  b. Apply weights to multiple correlators, which have different replica delays or track different frequency channels of the same signal c. Determine delay using any known method, such as early-minus-late correlators, MEDLL, strobe correlator, or super-resolution in the delay or channel domain.

In another aspect, the LOS path is chosen. Delay estimates and other characteristics can be used for each of the paths to find the LOS path. Any combination of the following criteria can be used:

a. TOA of the LOS path is the earliest for all paths
b. Post-beamforming signal amplitude is above some threshold level. The threshold may be determined by the SNR and/or noise level
c. DOA of the LOS path is within some tolerance from the estimated direction to the signal source.

In another aspect, the LOS delay can be output to navigation software.

GAME

SALSA alone may not be sufficient to produce good measurements in certain environments. SALSA outputs measurements for first-arrival signals. These measurements may be processed by a Kalman filter; however Kalman filters are vulnerable to any biases in the input measurements. For example, if a signal from a particular GNSS satellite has no LOS component (or the LOS component is too weak to be detected) then the first arrival will correspond to a multipath component, which is necessarily delayed. This creates a bias in some measurements, and will ruin the Kalman filter performance. GAME is designed to identify and eliminate faulty (i.e., non-LOS) measurements.

One well known prior art method used to identify faulty measurements is called Receiver Autonomous Integrity Monitoring (RAIM). RAIM is a popular algorithm for airplane navigation, where data integrity is important. Current RAIM methods check consistency of measurements to identify and eliminate one faulty measurement (there also was some work to extend RAIM to multiple faults). GAME is also directly to eliminating faulty measurements, but it is a substantial improvement upon RAIM in the following ways:

1. GAME is able to identify multiple faults,
2. GAME makes use of history of measurements, and
3. GAME yields a quantitative measure of the integrity of measurements in the form of measurement likelihood.

GAME builds on two known algorithms: Interacting Multiple Models (IMM) and Genetic Algorithms. In one embodiment, GAME simultaneously tracks multiple models; each model characterized by a particular allocation of LOS/non-LOS flags. For each model, GAME computes a Bayesian likelihood of that model being true. GAME assumes that multipath environment is dynamic, and accounts for a possibility of flips in LOS/non-LOS flags. Each epoch, GAME performs two major steps computing a priori and posteriori likelihoods for a set of models. The most posteriori likely model is used to select LOS-only measurements, which are then passed to the Kalman filter for processing.

By way of example, at epoch n the algorithm computes likelihoods for a set of models $L_n(m)$, where m identifies a model. At the next epoch, there is a new set of models, which are not necessarily the same as the models in the old set. There is a probability that particular LOS signals become non-LOS and vice versa. Thus a probability of a flip in each flag can be defined and the probability transition matrix can be computed from the old set to the new one. If this probability transition matrix is applied to posteriori likelihoods in the old set, we will get a priori likelihoods in the new set, which we denote $\tilde{L}_{n+1}(m)$.

Computation of posteriori likelihoods requires measurement redundancy. A covariance matrix for all measurements can be assigned. A basic assumption is that the error variance for a non-LOS measurement is large compared to that for LOS measurement (due to multipath-induced bias). The Bayesian probability density for having a particular set of measurements and some value of the user state (i.e., position, velocity and clock) can be computed as follows:

$$P(\vec{x}|\vec{R}) = \text{const} \cdot \exp\left\{-\frac{1}{2} \cdot \left(\vec{x} - \vec{x}(\vec{R})\right)^T \cdot \hat{Q}^{-1} \cdot \left(\vec{x} - \vec{x}(\vec{R})\right)\right\} \quad [15]$$

where $\hat{Q}$ is the covariance matrix $\vec{x}(\vec{R})$ are expected values of measurements for user state $\vec{R}$, and $\vec{x}$ are measurements. This probability density function is conditioned on the user state, which is unknown. The goal is to compute a Bayesian likelihood irrespective of the user state, which is the same as removing the condition in the above equation. This can be achieved by integrating the above equation over $\vec{R}$. Integration can be performed in the closed form. The resulting equation defines the Bayesian likelihood of a particular set of measurements with a particular set of LOS/non-LOS flags (the latter affects the covariance matrix and the normalization constant). This likelihood is combined with the a priori likelihood of the model to arrive at a posteriori likelihood. As was stated above, the model with the highest likelihood "wins", and measurements identified as LOS are passed to the Kalman filter for processing.

Conventional IMM implementation is not feasible for the applications discussed above due to a large number of models to track. To illustrate, if there are 10 signals, there are 1024 models (different allocations of LOS/non-LOS flags). It is clear that a workable solution must resort to tracking but a small fraction of all possible models. In GAME, a genetic algorithm (GA) is used to track only a subset of the possible models. There is some reasonably small set of models tracked by the algorithm concurrently. In each epoch, a model may remain in the set, may be eliminated, or may spawn more models to track. The fate of a model is dependent on its likelihood, which serves as a goal function in a typical genetic algorithm. Thus, most unlikely models face higher chances of elimination, and most likely ones have the offspring. A key aspect of integrating IMM and GA is the use of IMM-computed likelihood as the goal function of GAME.

As part of computing GAME likelihoods, a starting assumption is that measurements $\vec{Z}$ and their covariances $\hat{Q}$ are available. Also available is the measurement matrix $\hat{H}$. The unknowns include the position and clock vector $\vec{X}$ and the set of flags $\vec{N}$ for LOS/NLOS. The multipath signals are assumed to have additional bias in the measurements, and they may have a different variance as well. Additional bias is modeled as $\vec{G}*\vec{N}$, where $\vec{G}$ is a vector, and '*' is a per-component vector product of two vectors. We also recognize that for multipath measurements, the variances should be set to a higher value. This results in matrix $\hat{Q}$ being dependent on vector $\vec{N}$. However, this will not affect the derivation below, and this dependence is not specified explicitly to keep equations less cumbersome.

The likelihood to have vector $\vec{X}$ and the set of flags $\vec{N}$ is computed as follows:

$$\Lambda_0(\vec{X}, \vec{N}) = C \cdot \exp\left[-\frac{1}{2}(\vec{Z} - \hat{H}\vec{X} - \vec{G}*\vec{N})^T \cdot \hat{Q}^{-1} \cdot (\vec{Z} - \hat{H}\vec{X} - \vec{G}*\vec{N})\right].$$

In addition, prior information can be used in the likelihood computation, which comes from the output of the navigation filter. If the filter navigation solution is denoted by $\vec{x}$ and its covariance matrix by $\hat{P}$, then the equation for the likelihood takes the form:

$$\Lambda(\vec{X}, \vec{N}) = C \cdot \exp\left[-\frac{1}{2}(\vec{Z} - \hat{H}\vec{X} - \vec{G}*\vec{N})^T \cdot \hat{Q}^{-1} \cdot (\vec{Z} - \hat{H}\vec{X} - \vec{G}*\vec{N}) - \frac{1}{2}(\vec{X} - \vec{x})^T \cdot \hat{P}^{-1} \cdot (\vec{X} - \vec{x})\right] \quad [17]$$

However, to use it in updating model weights, just the likelihood of a vector of flags $\vec{N}$ is needed, irrespective of the user position and clock $\vec{X}$. This means that the equation for $\Lambda(\vec{X}, \vec{N})$ is integrated with respect to $\vec{X}$. To solve the integral, we transform the argument of the exponent to a more manageable form:

$$E = (\vec{Z} - \hat{H}\vec{X} - \vec{G}*\vec{N})^T \cdot \hat{Q}^{-1} \cdot (\vec{Z} - \hat{H}\vec{X} - \vec{G}*\vec{N}) + (\vec{X} - \vec{x})^T \cdot \hat{P}^{-1} \cdot (\vec{X} - \vec{x}) = \vec{X}^T \cdot (\hat{H}^T \cdot \hat{Q}^{-1} \cdot \hat{H} + \hat{P}^{-1}) \cdot \vec{X} + \vec{X}^T \cdot \hat{H}^T \cdot \hat{Q}^{-1} \cdot \vec{\xi} + \vec{\xi}^T \cdot \hat{Q}^{-1} \cdot \hat{H} \cdot \vec{X} + \vec{\xi}^T \cdot \hat{Q}^{-1} \cdot \vec{\xi} + \vec{X}^T \cdot \hat{P}^{-1} \cdot \vec{X} - \vec{X}^T \cdot \hat{P}^{-1} \cdot \vec{x} - \vec{x}^T \cdot \hat{P}^{-1} \cdot \vec{X} + \vec{x}^T \cdot \hat{P}^{-1} \cdot \vec{x} \quad [18]$$

where $\vec{\xi} = \vec{G}*\vec{N} - \vec{Z}$ is denoted, for brevity.

The right hand side of the last equation is a quadratic form for $\vec{X}$. It can be converted to the canonical form by performing a variable transformation:

$$\vec{X} = \hat{M} \cdot \vec{\rho} \quad [19]$$

The quadratic term is now as follows:

$$\vec{X}^T \cdot (\hat{H}^T \cdot \hat{Q}^{-1} \cdot \hat{H} + \hat{P}^{-1}) \cdot \vec{X} = \vec{\rho}^T \cdot \hat{M}^T \cdot (\hat{H}^T \cdot \hat{Q}^{-1} \cdot \hat{H} + \hat{P}^{-1}) \cdot \hat{M} \cdot \vec{\rho} \quad [20]$$

This term is diagonalized (i.e., converted to the canonical form) if the variable transformation matrix is given by $$\hat{M} = \hat{J}^{T-1} \quad [21]$$

where $\hat{J}$ is a factor in the LU-decomposition $$\hat{H}^T \cdot \hat{Q}^{-1} \cdot \hat{H} + \hat{H} \hat{P}^{-1} = \hat{J} \cdot \hat{J}^T. \quad [22]$$

In the new variables, the argument of the exponent takes the following form:

$$E = \hat{\rho}^T \cdot \hat{\rho} + 2 \cdot \hat{D}^T \cdot \vec{\rho} + F = (\vec{\rho} + \vec{D})^2 + F - D^2 \quad [23]$$

where the following notations are used:

$$\vec{D} = \hat{M}^T \cdot (\hat{H}^T \cdot \hat{Q}^{-1} \cdot \vec{\xi} - \hat{P}^{-1} \cdot \vec{x}) \quad F = \vec{\xi}^T \cdot \hat{Q}^{-1} \cdot \vec{\xi} + \vec{x}^T \cdot \hat{P}^{-1} \cdot \vec{x} \quad [28]$$

Substituting the expression for E into that for $\Lambda(\vec{X}, \vec{N})$ and integrate the result with respect to $\vec{X}$:

$$\Lambda(\vec{N}) = \int\int\int \Lambda(\vec{X}, \vec{N}) \cdot d^3\vec{X} = const \cdot \|\hat{M}\| \cdot \exp\left[\frac{1}{2}(D^2 - F)\right]. \quad [25]$$

The constant multiplier and $\|\hat{M}\|$ will be canceled when likelihood values for all models are normalized, and therefore do not have to be computed. This is the final (albeit still not normalized) equation for the likelihood of each model. It accounts for both the new measurements and for the prior information in the form of a navigation solution.

Figure 4:
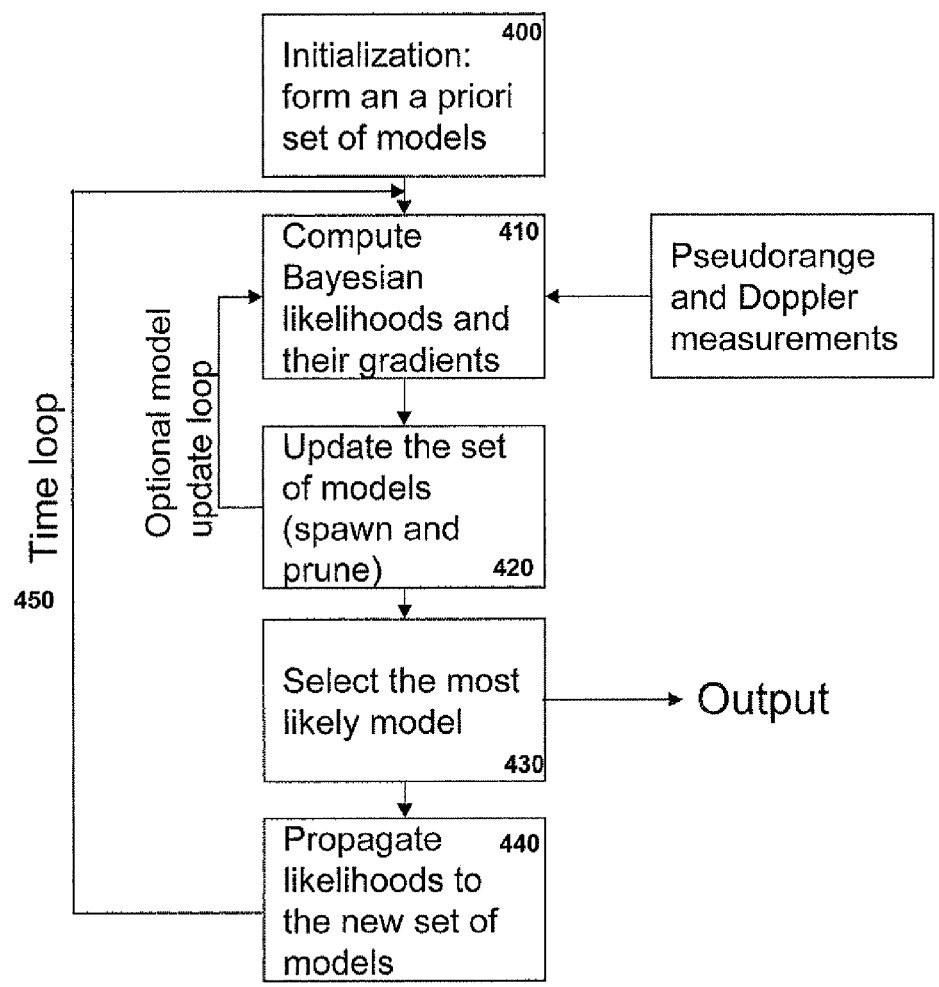
FIG. 4 is a simplified pictorial representation of the Genetic Algorithm for Multipath Elimination (GAME) algorithm.

With Reference to FIG. 4, a simplified flow chart of the operation of the GAME method is illustrated. For the first epoch, an initial set of models is created 400. Models differ by LOS/non-LOS flags for different signals, each model having its own likelihood that is set to an a priori value. Next likelihoods and likelihood gradients in the LOS flag space can be computed 410. The current list of models is stored for future reference in memory (this list is denoted List_0). Based on likelihood gradients, likelihoods for new models can be computed, each differing from a current model by flipping one LOS flag. If new models have higher likelihoods than current ones, the new models are included in the set. This is repeated some number of times. Models are removed from the set if their likelihoods are lower than a threshold. The threshold is dynamically adjusted to keep some reasonable number of models in the set. New models are spawned and old ones pruned to produce an updated set of models, denoted as List_1 420. The most likely model is selected and its LOS flags outputted 430. Measurements corresponding to non-LOS signals will be discarded from processing by the navigation filter. All models are then propagated to the next epoch 440. All models in List_0 and all models in List_1 are then looped through 450.

Next the probabilities of transition from a model in List_0 to a model in List_1 is computed. The next step is to multiply the likelihood of the model in List_0 by the transition probability and tally it in the likelihood of the model in List_1 and proceed to the next time epoch.

One aspect the present disclosure is directed to a system and method which processes pseudorange, Doppler and ADR measurements from several navigation signal sources (such as GPS satellites), where some measurements can be substantially corrupted by the effects multipath or by other biases.

In another aspect, the present disclosure processes multiple models, where each model is characterized by assuming that some signals are non-biased (e.g., not affected by multipath, or affected insignificantly), and other signals are biased (e.g., corrupted by multipath delays). The number of models processed can be less than the total number of possible models. For example, if there are S sources, the total possible number of models, which assume all possible allocations between biased and non-biased measurements, is equal to $2^S$. The number of processed models can be limited by the amount of processing power available to the user.

In another aspect, each processed model has a priori and posteriori likelihood values associated with it. The a priori likelihood computation assumes that each processed model at the current epoch has originated from a model, processed at the previous time epoch. The current model may be identical to one of the previous models, in which case its a priori likelihood depends on the probability of the signals not changing from biased to not-biased category and vice versa. Alternatively, the current model may differ from any model at the previous time epoch, in which case its a priori likelihood depends on the probability of a signal switching between the biased and non-biased category.

In yet another aspect, for each processed model, the algorithm computes the posteriori Bayesian likelihood of measurements obtained by the receiver, This likelihood is computed by combining the a priori likelihood with the probability of obtaining the last epoch's set of measurements. It will be different for different models, since a priori probability distributions for measurement residuals are different for biased and non-biased measurements. Typically, biased measurements would have larger variances, and the expected value of residuals of biased measurements may have non-zero mean.

For some or all of the processed models, the algorithm may also compute posteriori likelihoods of some derivatives of these models. For example, the algorithm may compute the likelihoods of models, where one signal source is moved from the biased to the non-biased category, or vice versa. From all candidate models (processed models and their derivatives), the algorithm selects models with highest likelihood values, which are retained. Models with lower likelihood values are destroyed. This selection process forms a set of models for computing a priori likelihoods for the next epoch. In other words, a priori likelihoods for the epoch are computed from posteriori likelihoods for the previous epoch. The model with the highest likelihood is selected. Measurements, which are flagged as non-biased for this model, are passed to the navigation filter for processing. Measurements which are deemed biased are not processed by the navigation filter.

WAFFLES

Another problem in prior art navigation systems is the errors introduced by Signals of Opportunity (SoOP) geolocation errors, and reference station calibration and timing errors. A priori locations of SoOPs may not be known accurately and therefore SoOPs must be geolocated using navigation infrastructure. Assuming that SoOPs are geolocated using the very same reference stations, which provide data to the user (possibly, even at the same time), SoOP geolocation errors are largely due to errors at the reference stations, and the latter are at the root of the problem. Thus, both types of errors must be mitigated jointly. We refer to these errors as CTG errors (for Calibration, Timing, and Geolocation).

Normally, any error in the source location, reference station calibration, or reference station timing translates into an error in user TDOA ranging. For example, if a source is hypothetically geolocated with 50 m accuracy, the same order of magnitude accuracy for the user navigation is observed, which could severely degrade navigation accuracy.

However, there is a small parameter to exploit. The errors in question are normally much smaller than other distances in the problem, e.g. those from the source to the user and from the source to reference stations. The ratio of the source geolocation error to the spatial scale of the problem is small, e.g. 50 m/5000 m~$10^{-2}$. The basic idea is to compute a weighted average of TDOA measurements in such a way that the effects of CTG errors cancel. If this goal is achieved, then the ranging error will be non-zero in the second-order approximation only. This may reduce the ranging error from ~50 m to about $50 \times 10^{-2}$ m=0.5 m.

This method described in this disclosure is referred to as WAFFLES, which is designed to cancel effects of CTG errors in the first order approximation (with respect to the small parameter defined above). Even though this method may be an important piece of the puzzle to meet performance requirements, it should not be viewed as an excuse to relax efforts on calibrating reference stations and geolocating SoOPs accurately. Indeed, the performance of WAFFLES will depend on the geometry of the problem. Even though the first-order error is canceled, the second-order error may still be a concern for some geometries. This is when calibration and synchronization of reference stations becomes important. Moreover, the WAFFLES method allows an excellent return on any improvement in the calibration and timing. For example, reducing calibration error by a factor of 2 may reduce the second-order user ranging error by a factor of 4.

As compared to well known location of GPS satellites, SoOPs introduce a number of additional error sources. One of the most important error sources is due to timing and calibration errors at the reference station, and associated error in SoOP geolocation.

Figure 5:
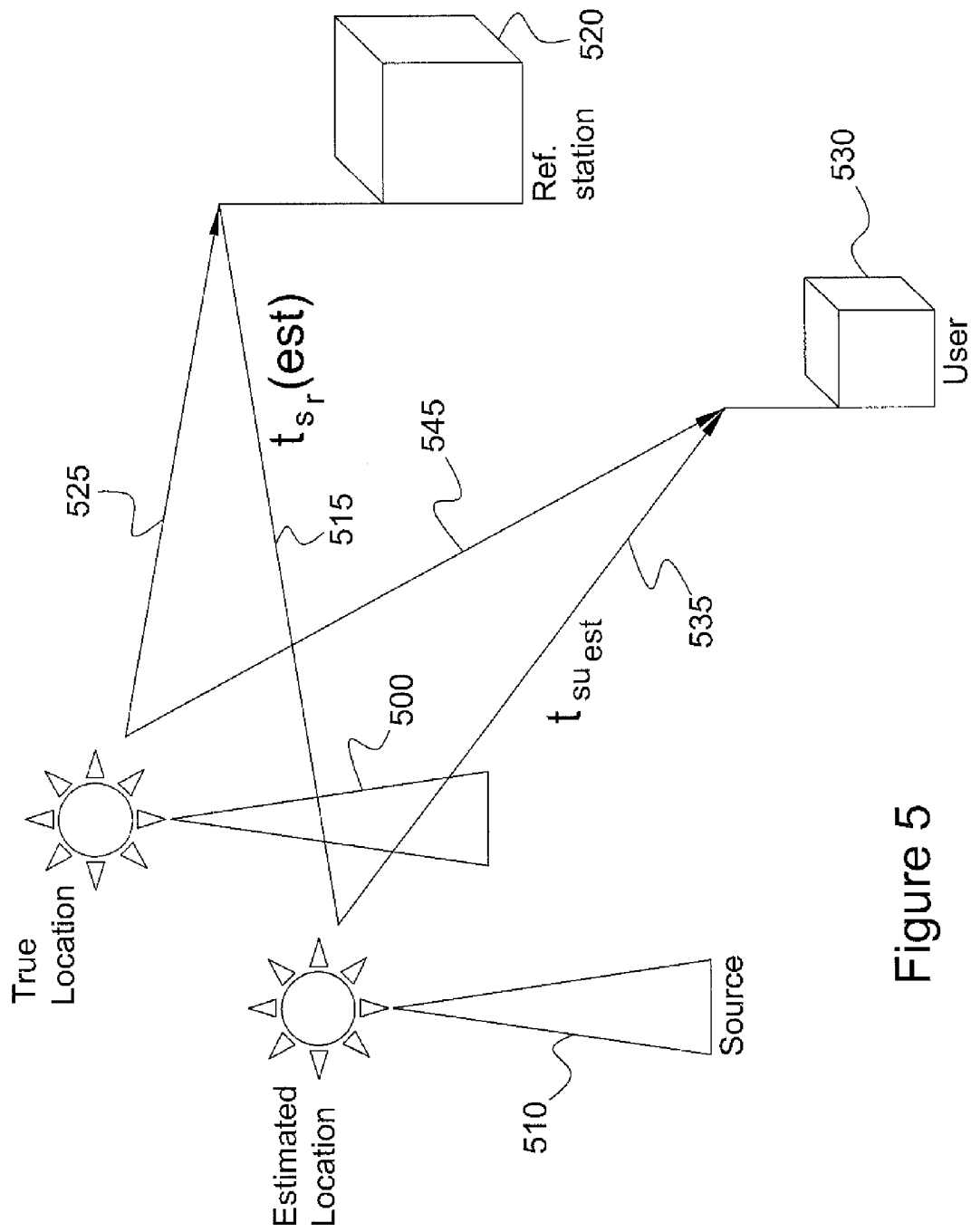
FIG. 5 is a simplified pictorial representation of the effects of timing and calibration errors on source geolocation.

The geometry of the problem is shown in FIG. 5. SoOP location is not known precisely. If there is an error in the SoOP location estimate, it directly seeps into the error for TDOA and then into the user navigation error. For example, if the source is located at point 500 instead of point 510, the time for the signal to travel 515 from the estimated position 510 to reference station 520 is greater than the time for the signal to travel 525 from the actual source position 500 to the reference station 520 which introduces a timing error. Likewise, the time for the signal to travel 535 from the estimated position 510 to user 530 is less than the time for the signal to travel 545 from the actual source position 500 to the user 530 which introduces a timing error. The timing errors will then be introduced into the TDOA measurements. Below a way to cancel effects of reference station calibration is described.

This problem turns out to be somewhat complicated. The reason for this is the lack of the number of degrees of freedom available. If there are N reference stations, then there are N weights to play with. There are also N calibration errors to cancel, which is N constraints to satisfy. However, it is required that the sum of weights is equal to one, which adds one more constraint, for the total of N+1 constraints. Thus, all constraints can not be satisfied with N weights, and something has to be sacrificed.

As described below, it can be shown that the user ranging error due to reference station calibration errors is given by (in the linear approximation):

$$\delta \vec{\rho} = K \cdot \Delta \vec{t} \quad [26]$$

This is the un-modeled error for the user for TDOA measurements using different reference stations. The error is due to reference station calibration errors $\Delta \vec{t}$ and SoOP geolocation errors (which are in turn due to reference station calibration errors). If there are N reference stations, there are N components in the calibration error $\Delta \vec{t}$ and correspondingly N TDOA measurements (each with respect to a different reference station) per SoOP.

This disclosure is directed to canceling these TDOA errors by computing a weighted sum of measurements at the cost of sacrificing two SoOP measurements. The approach is similar to GPS double differencing, but regular double differencing will not work here. In the case of GPS, double differencing cancels satellite clock error (which is a bit analogous to canceling reference station calibration errors in the present case) and satellite ephemeris errors (which are analogous to SoOP geolocation errors). However, GPS has the great advantage that a satellite is very far off, and all LOS are essentially parallel. If reference stations and the user are scattered across the area, like in our case, the plain old double differencing would not work. Hence the need for an approach like WAFFLES.

Additionally, weights can be computed for any epoch by the receiver, but they depend on the estimated user position. If the user moves around quite a bit, then weights will be time dependent. Since they are used as coefficients for terms, which define the partial derivatives of the measurement with respect to the user position, this is equivalent to changing the "virtual location" of the equivalent TOA SoOP measurement. This will not be a problem for a navigation code, which is designed from scratch properly.

By way of illustration, consider a 3D case with 4 reference stations (a 2D case with 3 reference stations is completely analogous). The pseudorange equation for the j-th reference station:

$$\rho_j = |\vec{R}_j - \vec{S}| + \theta + \Delta t_j \quad [27]$$

where $\vec{R}_j$ is the position of the reference station, $\vec{S}$ is position of the source, $\theta$ is the true timing of some feature in the SoOP signal, and $\Delta t_j$ is the calibration error.

Assuming some initial approximation $\vec{S}_0$ for the SoOP location, the estimated position $\hat{\vec{S}}$ of the SoOP is computed as a correction to this initial approximation:

$$\hat{\vec{S}} = \vec{S}_0 + \delta\vec{S}. \quad [28]$$

The unknowns are $\delta\vec{S}, \theta$, which can be combined into one vector $\delta x = \{\delta\vec{S}, \theta\}$. Then in the first order the solution for $\delta x$ is obtained from a linear system of equations:

$$\delta\vec{x} = N^{-1} \cdot (\rho - |\vec{R} - \vec{S}_0| - \Delta t) \quad [29]$$

where components of 4-vector $\rho - |\vec{R} - \vec{S}_0| - \Delta t$ correspond to different reference stations (i.e., j-th component is $\rho_j - |\vec{R}_j - \vec{S}_0| - \Delta t_j$) and where the 4×4 matrix N is defined by the following:

$$N_{jk} = \begin{cases} \dfrac{\partial |\vec{S} - \vec{R}_j|}{\partial S_k} & \text{if } k \leq 3 \\ 1 & \text{if } k = 4 \end{cases} \quad [30]$$

The solution for $\delta\vec{x}$ has two additive parts: the exact correction, and the error due to reference station calibration. They can be separated:

$$\delta\vec{x} = \delta\hat{x}_0 + \vec{\epsilon} \quad [31]$$

where $$\delta\vec{x}_0 = N^{-1} \cdot (\rho - |\vec{R} - \vec{S}_0|)$$

$$\vec{\epsilon} = N^{-1} \cdot \Delta t \quad [32]$$

Vector $\vec{\epsilon}$ is the SoOP geolocation error. As we shall see shortly, it affects the user position error.

Proceeding to estimating the user position, the user pseudorange equation is as follows:

$$\rho_u = |\vec{Y} - \vec{S}| + \theta + \Delta t_u \quad [33]$$

where $\vec{Y}$ is the true user position, and $\Delta t_u$ is the user clock error. The true TDOA with the reference station pseudorange is as follows:

$$\rho_u - \rho_j = |\vec{Y} - \vec{S}| + \Delta t_u - |\vec{R}_j - \vec{S}| - \Delta t_j. \quad [34]$$

To process this measurement, it is compared with the estimate for TDOA, i.e. compute the residual. This residual will comprise two parts: (a) The "legitimate part", which is due to the user clock and user position error. These are unknowns we solve for, so we need that error in the residual to have something to process; and (b) The "error part", which we do not model and do not solve for. This part is due to term $\Delta t_j$ and due to SoOP geolocation error $\vec{\epsilon}$, which is ultimately due to $\Delta t_j$ as well.

The present disclosure is directed to the second part. To make the math less cumbersome, only the second error source is retained and the residual due to the user position and clock errors is not computed:

$$\delta\vec{\rho} = M\vec{\epsilon} - \Delta\vec{t} \quad [35]$$

where 4×4 matrix M is defined by:

$$M_{jk} = \begin{cases} \dfrac{\partial |\vec{Y} - \vec{S}| - |\vec{R}_j - \vec{S}|}{\partial S_k} & \text{if } k \leq 3 \\ 0 & \text{if } k = 4 \end{cases} \quad [36]$$

Substituting $\vec{\epsilon}$ gets:

$$\delta\vec{\rho} = (MN^{-1} - I) \cdot \Delta\vec{t}. \quad [37]$$

Next, we introduce the notation $$K = MN^{-1} - I \quad [38]$$

to get:

$$\delta\vec{\rho} = K \cdot \Delta\vec{t} \quad [39]$$

Unfortunately, computation shows that matrix K does not have a full rank. Computing it explicitly for a 2D case is somewhat involved, but important. Assuming there are three reference stations.

$$\delta\vec{S} \cdot \vec{U}_j = \Delta\vec{t}_j + \delta\theta \quad [40]$$

where $$\vec{U}_j = \frac{\vec{S} - \vec{R}_j}{|\vec{S} - \vec{R}_j|} \quad [41]$$

is the unit vector in the SoOP to reference station direction.

Differencing equations 0 and 1, and 1 and 2 in [40] to cancel $\delta\theta$ and solve for $\delta\vec{S}$ to get:

$$\delta S_k = \sum_j \alpha_{kj} \Delta t_j \quad [42]$$

where subscript k is for x, y components and $$a_{x0} = \frac{U_{21y}}{D}; \quad a_{x1} = \frac{U_{02y}}{D}; \quad a_{x2} = -\frac{U_{01y}}{D}; \quad [43]$$

$$a_{y0} = \frac{U_{12x}}{D}; \quad a_{y1} = -\frac{U_{02x}}{D}; \quad a_{y2} = \frac{U_{01x}}{D}$$

and $$U_{pqk} = U_{pk} - U_{qk}$$

$$D = U_{01y} U_{02x} - U_{02y} U_{01x} \quad [44]$$

User TDOA error is given by (see (8)):

$$\delta\rho_j = \xi_{jx} S_x + \xi_{jy} S_y + \Delta t_j \quad [45]$$

where $$\xi_{jk} = \frac{S_k - Y_k}{|\vec{S} - \vec{Y}|} - \frac{S - R_{jx}}{|\vec{S} - \vec{R}_j|} \quad [46]$$

Thus, matrix K is given by:

$$K_{jm} = \xi_{jx} a_{xm} + \xi_{jy} a_{ym} \delta_{jm}. \quad [47]$$

Next we compute $K_{jm}$ explicitly for some specific m, for example for m=0 and for different values of j.

Case m=0; j=

$$\xi_{1x} a_{x0} + \xi_{1y} a_{y0} = \frac{S_x - Y_x}{|\vec{S} - \vec{Y}|} \cdot a_{x0} + \frac{S_y - Y_y}{|\vec{S} - \vec{Y}|} \cdot a_{y0} - \quad [48]$$

$$\frac{\{U_{x1} \cdot (U_{y2} - U_{y1}) + U_{y1} \cdot (U_{x1} - U_{x2})\}}{D} =$$

$$\frac{S_x - Y_x}{|\vec{S} - \vec{Y}|} \cdot a_{x0} + \frac{S_y - Y_y}{|\vec{S} - \vec{Y}|} \cdot a_{y0} - \frac{\{U_{x1} \cdot U_{y2} - U_{y1} \cdot U_{x2}\}}{D}$$

Case m=0; j=2

$$\xi_{1x} a_{x0} + \xi_{1y} a_{y0} = \frac{S_x - Y_x}{|\vec{S} - \vec{Y}|} \cdot a_{x0} + \frac{S_y - Y_y}{|\vec{S} - \vec{Y}|} \cdot a_{y0} - \quad [49]$$

$$\frac{\{U_{x2} \cdot (U_{y2} - U_{y1}) + U_{y2} \cdot (U_{x1} - U_{x2})\}}{D} =$$

$$\frac{S_x - Y_x}{|\vec{S} - \vec{Y}|} \cdot a_{x0} + \frac{S_y - Y_y}{|\vec{S} - \vec{Y}|} \cdot a_{y0} - \frac{\{U_{x1} \cdot U_{y2} - U_{y1} \cdot U_{x2}\}}{D}$$

Case in =0; j=0

$$\xi_{1x} a_{x0} + \xi_{1y} a_{y0} + 1 = \frac{S_x - Y_x}{|\vec{S} - \vec{Y}|} \cdot a_{x0} + \frac{S_y - Y_y}{|\vec{S} - \vec{Y}|} \cdot a_{y0} - \quad [50]$$

$$\frac{\{U_{x0} \cdot (U_{y2} - U_{y1}) + U_{y0} \cdot (U_{x1} - U_{x2})\}}{D} + 1 = \frac{S_x - Y_x}{|\vec{S} - \vec{Y}|} \cdot a_{x0} +$$

$$\frac{S_y - Y_y}{|\vec{S} - \vec{Y}|} \cdot a_{y0} - \frac{U_{x0} \cdot U_{y2} - U_{x0} \cdot U_{y1} + U_{y0} \cdot U_{x1} - U_{y0} \cdot U_{x2}}{D} +$$

$$\frac{U_{01y} U_{02x} - U_{02y} U_{01x}}{D} = \frac{S_x - Y_x}{|\vec{S} - \vec{Y}|} \cdot a_{x0} + \frac{S_y - Y_y}{|\vec{S} - \vec{Y}|} \cdot a_{y0} -$$

$$\frac{U_{x0} \cdot U_{y2} - U_{x0} \cdot U_{y1} + U_{y0} \cdot U_{x1} - U_{y0} \cdot U_{x2}}{D} +$$

$$\frac{U_{y0} U_{x0} - U_{y0} U_{x2} - U_{y1} U_{x0} + U_{y1} U_{x2} -}{D}$$
$$\frac{U_{y0} U_{x0} + U_{y0} U_{x1} + U_{y2} U_{x0} - U_{y2} U_{x1}}{D} =$$

$$\frac{S_x - Y_x}{|\vec{S} - \vec{Y}|} \cdot a_{x0} + \frac{S_y - Y_y}{|\vec{S} - \vec{Y}|} \cdot a_{y0} - \frac{\{U_{x1} \cdot U_{y2} - U_{y1} \cdot U_{x2}\}}{D}.$$

Amazingly, $K_{00} = K_{10} = K_{20}$. The same holds true for other values of m.

This means that errors in a particular reference station contribute the same value to the user TDOA error regardless of whether the same or different reference station is used for making that TDOA. If it is the same station, then this contribution is via SoOP geolocation error and the reference station calibration error. If a different station is used, the TDOA user error is due to SoOP geolocation error only. Yet, in both cases, the net result is the same.

This complicates the algorithm, forcing a more costly route. First, there is no absolute concept of time (as in GPS), and therefore timing and calibration errors at one station can be set to zero. This station will be treated as an absolute time reference.

In this case, there are 2 independent non-zero calibration errors for 3 stations, e.g. $\Delta t_0 = 0$; $\Delta t_1$, $\Delta t_2 \neq 0$.

Considering 3 SoOPs and introducing another subscript to equations to denote a particular SoOP. In addition, only TDOA measurements from one reference station (recall that errors from all stations are equal, so any station will suffice) are considered, which is denoted with as m=0. User TDOA error (again, with any reference station, e.g. with station 0) is given by:

$$\delta \rho_s = \sum_j K_{s0j} \cdot \Delta t_j \quad [51]$$

where subscript s denotes different SoOPs, and not different reference stations as in (13). Setting $\Delta t_0 = 0$, we combine measurements for three SoOPs with weights $\alpha_s$ such that coefficients for $\Delta t_1$, $\Delta t_2$ cancel, and the sum of weights is equal to 1 (so far). This produces the following system of equations for $a_s$:

$$K_{001} \alpha_0 + K_{101} \alpha_1 + K_{201} \alpha_2 = 0$$

$$K_{002} \alpha_0 + K_{102} \alpha_1 + K_{202} \alpha_2 = 0$$

$$\alpha_0 + \alpha_1 + \alpha_2 = 1$$

If TDOA measurements from 3 SoOPs are linearly combined with weights $\alpha_s$, the first order error cancels.

The WAFFLES method assumes some typical reference station position errors and some geometry (i.e., user, SoOP, and reference stations positions), computes the true and the estimated value of TDOAs for 3 SoUPs, computes coefficients $\alpha_s$ and then combines measurements. If the algorithm works, the difference between the two weighted averages must be relatively small.

Implementation of the algorithm has two subtleties, which are described below:

1. Geolocation is done in 2D. Vertical positions of SoOPs are assumed to be known with some accuracy. The truth measurements and the estimated measurements are simulated using the true and the estimated vertical positions of SoOPs respectively.
2. User position is not known perfectly either. If the user were located exactly at the estimated position, the net results of using TDOA measurements with WAFFLES algorithm would be the measurement residual in the amount of the error, not compensated by WAFFLES. If the user is off its estimated position (i.e., if there is a position error estimate by the navigation filter), then there is an additional error source. This error is due to an error in the LOS direction to the SoOP (LOS is computed the estimated SoOP position instead of the true one). The magnitude of this error is the difference of the projection of the user position error on the estimated LOS and the true LOS. Assuming that the vector of the user position error can point at any direction equally probable means that this additional error can be negative, positive, or zero. The average magnitude of it is $1/\sqrt{2}$ of the maximum error. The same is true for the SoOP geolocation error. Two factors of $1/\sqrt{2}$ produce a factor of ½, yielding the following:

$$\varepsilon = \frac{|\vec{\delta U}| \cdot |\vec{\delta S}|}{2|\vec{U} - \vec{S}|} \quad [53]$$

where $\vec{\delta U}$ is the user position error, $\vec{\delta S}$ is the SoOP geolocation error, and $\vec{U} - \vec{S}$ is the range to the SoOP.

There is just one more little modification to the equations to be made. The weighted sum of TDOA measurements can be used in the Kalman filter for navigating the user. Normally, a TOA or TDOA measurement equation has the position of the user in the form like $|\vec{U} - \vec{S}|$+const. This means that partial derivatives of the measurement equation with respect to the user position form a unit vector in the direction of the source. Thus, the RSS (root sum squared) of the partials is equal to one. Note that $\alpha_0 + \alpha_1 + \alpha_2 = 1$ for weighted TDOA does not guarantee this condition. In order to imitate this condition for the new weighted TDOA measurement, it should be scaled. (In general, this is not necessary, but keeps the lineage to the conventional TOA/TDOA processing; scaling becomes necessary if the Kalman filter formulation is not changed from the conventional TOA/TDOA processing.) Thus, partial derivatives can be computed with respect to the user position and then the scaling can be computed:

$$w^2 = \left(\sum_s \alpha_s \frac{\vec{U} - \vec{S}_{sx}}{|\vec{U} - \vec{S}|}\right)^2 + \left(\sum_s \alpha_s \frac{\vec{U} - \vec{S}_{sy}}{|\vec{U} - \vec{S}|}\right)^2 \quad [54]$$

Now the desired weighted TDOA measurement is given by:

$$\tilde{\rho} = \frac{1}{w} \sum_s \alpha_s \rho_s \quad [55]$$

where $\rho_s$ are TDOA measurements for SoOP s using reference station 0.

Figure 6:
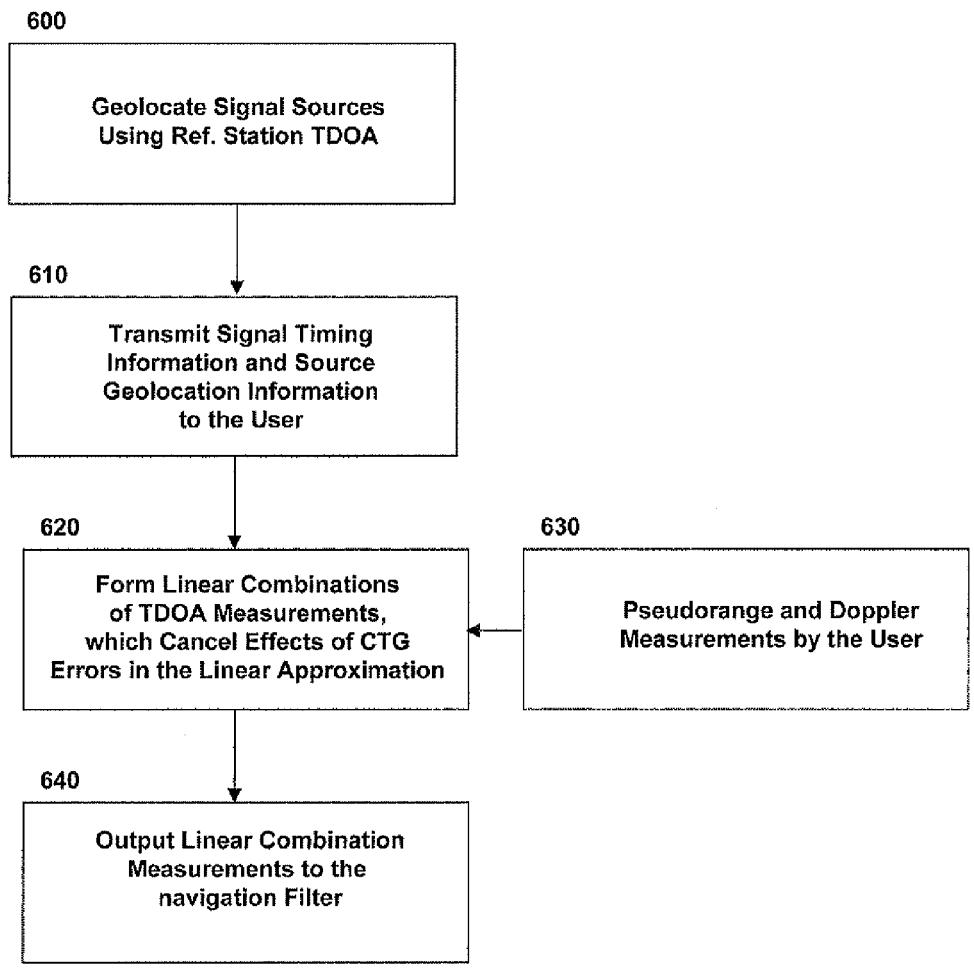
FIG. 6 is a simplified pictorial representation of the Weighted Average Functionality For Limiting Error Sources (WAFFLES) algorithm.

FIG. 6 illustrates a simplified block diagram of the WAFFLES method. Reference stations measures timing features of the transmitted signals 600. The transmitted signals can be satellite signals or terrestrial signals. The reference stations transmit this information and source geolocation to the user via a communications channel 610. Locations of the reference stations are known with a high accuracy (e.g., positions are surveyed). Locations of the signal transmitters is generally known approximately, with some accuracy (e.g., from design drawings for a cell tower). Multiple reference stations are used to geolocate each signal transmitter. The effects of calibration, timing, and geolocation (CTG) errors at the reference stations are mitigated by the user 620. The user makes pseudorange and Doppler measurements 630. Navigation equations for the user are formulated to explicitly express dependence of pseudorange on the CTG errors. Navigations equations are linearized with respect to CTG errors. Navigations equations are linearly combined to cancel the linear component of CTG-induced pseudorange errors. The linear combination measurements are output to a navigation filter 640.

Estimating Location of a Static User under Foliage

Another aspect of the present disclosure provides a method of estimating user location under foliage or for other environments dominated by scattering of GPS signals. In one embodiment, the statistical properties of the foliage are assumed to be known with some reasonable accuracy. It is not necessary to know the positions of individual twigs and leaves, rather, correlations for the channel impulse response can be used.

In one embodiment, the user receiver has a bank of correlators. The receiver can compute correlations between the replica waveform and the signal waveform at different delays. Thus, for each SoOP there will be a large number of correlation measurements, taken at different time epochs and at different delays. Measurements, which are sufficiently separated in time and/or delay will not be correlated; however, measurements taken at adjacent time epochs or by adjacent correlators will be correlated. Correlation is due to two separate effects. First, the scattering medium (foliage) is the same for different measurements; thus there will be signal components coming from same branches, twigs and leaves. Second, the signal bandwidth is obviously limited; this creates correlation of measurements over delays, which are separated by less than the inverse bandwidth of the signal.

The channel impulse response (CIR) for a particular SoOP is a function of delay $\tau$ and time t. The time dependence is due to the satellite motion and the change in the environment (e.g., wind moves the leaves):

$$R = R(\tau, t) \quad [56]$$

The CIR has the LOS peak at $\tau = 0$, which corresponds to the true user position.

The correlation of this signal with the replica waveform is measured. The correlation as a function of delay and time is given by convolution of CIR with the autocorrelation function of the waveform:

$$C(\tau,t) = R(\tau,t) * A(\tau) = \int R(\theta,t) \cdot A(\tau - \theta) d\theta. \quad [57]$$

Assuming that statistical properties of $R(\tau, t)$ are known, pair-wise covariances for values of $C(\tau,t)$ can be computed:

$$Q(\rho_i, t_i, \tau_j, t_j) = E\{C(\tau_i, t_i) \cdot C^*(\tau_j, t_j)\} = \iint R(\theta_1, t_i) \cdot A(\tau_1 - \theta_1) R^* (\theta_2, t_j) \cdot A(\tau_j - \theta_2) d\theta_1 d\theta_2 \quad [58]$$

Similarly, a noise covariance matrix can be computed $$\eta(\tau_i, t_i, \tau_j, t_j) = E\{n(\tau_i, t_i) \cdot n^*(\tau_j, t_j)\}. \quad [59]$$

This computation can be done once for each type of forest and stored at the receiver in the form of a lookup function for different pairs of angles of arrival and delays. (Even though arguments for this covariance matrix include time, and not the angle of arrival per se, the statistics is mostly due to the change in the angle as the time progresses and satellite SoOP moves. From a pre-stored table, the receiver can extract the covariance matrices for a particular satellite pass using the specific geometry.)

The problem can be formulated as follows. Correlations between the signal and the waveform replica can be measured. These measurements comprise a realization $\tilde{C}$ of a random process. The receiver position can be estimated from this data.

An estimate for the overall offset of the delay can be denoted with a hat, $\hat{\tau}$. At a particular time, $\hat{\tau} = \tau - \Delta \vec{r} \cdot \vec{l}(t)$, where $\Delta \vec{r}$ is the error in the user position estimate, and $\vec{l}(t_i)$ is the LOS direction at time $t_i$. When the correlations $\tilde{C}$ are measured, the true value of the replica delay τ is unknown and therefore the estimate delay $\hat{\tau}$ is used. Thus, measured correlations are in the form $\tilde{C}(\hat{\tau}, t)$. The main concept is that if the position error is zero, then $\hat{\tau}=\tau$, and the measured realization of the random process is most likely in the statistical sense. Thus, the goal is to find such $\hat{\tau}$, that equation $$\tilde{C}(\hat{\tau},t)=C(\tau,t)+n(\tau,t) \quad [60]$$

is the most likely realization of the random process for $C(\tau,t)$ and $n(\tau,t)$.

For discrete values of $\tau_i, t_i$, equation [60] can be viewed as an over-determined system of linear equations for $C(\tau_i, t_i), n(\tau_i, t_i)$. If one long vector of unknowns is formed $x=\{C(\tau_i, t_i) \mid n(\tau_i, t_i)\}$ then equation [60] can be written in the form:

$$Mx=\tilde{C}(\hat{\tau},t) \quad [61]$$

where matrix M has the following structure:

$$M = \begin{pmatrix} 1 & & 0 & 1 & & 0 \\ & \ddots & & & \ddots & \\ 0 & & 1 & 0 & & 1 \end{pmatrix} \quad [62]$$

A solution of equation [61] is sought while minimizing the following quadratic form (this is what makes the solution the most likely one):

$$F=xWx^* \quad [63]$$

where the covariance matrix W is constructed from the covariance matrices for the signal and for the noise:

$$W = \begin{pmatrix} Q & 0 \\ 0 & \eta \end{pmatrix} \quad [64]$$

This is called a linear equality-constrained least squares problem, and there are efficient numerical routines to solve it. Since $\hat{\tau}$ depends on the user position error, the solution will too be a function of the position error (via equation [61]). Thus, the value of the quadratic form [63] will be a function of the user position error. By varying $\Delta \vec{r}$, the absolute minimum of F can be found. The minimum value of F will correspond to the position error, which makes measurements the most likely realization of the random process, i.e. the best estimate in the statistical sense.

Figure 7:
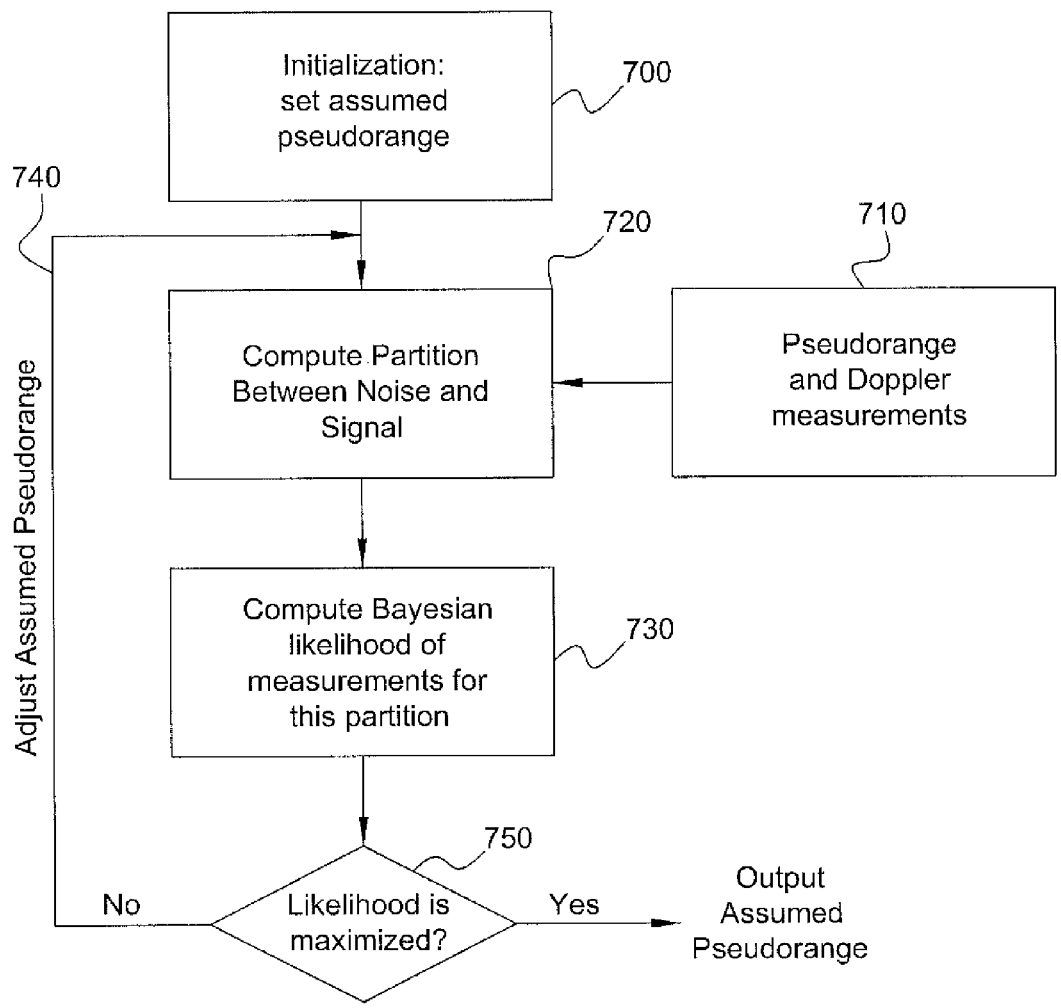
FIG. 7 is a simplified pictorial representation of the LEAF algorithm.

FIG. 7 illustrates LEAF processing. From as assumed initial pseudorange 700, pseudorange, Doppler and ADR measurements from several navigation signal sources (such as GPS satellites) are collected 710, where measurements are corrupted by diffuse scattering of the signal, e.g. from foliage. Multiple correlators may be used, which estimate correlations of the signal with the signal replica. The correlators may differ by the delays of the signal replica. The measured correlation values are assumed to be generated by the noise and (at least for some correlators) by the direct and scattered signal. Using the statistical properties of noise and the scattered signal (which are preset in the receiver for typical environments), the present disclosure computes the most likely partition of measured values into noise and signal 720. The Bayesian likelihood associated with this partition is calculated 730. By varying the assumed value of the pseudorange 740, the algorithm maximizes the Bayesian likelihood of the noise/signal partition. The pseudorange value which maximizes the likelihood, is the estimated pseudorange 750.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "processors or processing" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A method of mitigating multipath interference in a received signal comprising the steps of:
   (a) receiving at a user a plurality of RF signals over time intervals from a transmitter, wherein at least one of the plurality of RF signals is a line-of-sight signal and wherein at least one of the plurality of RF signals is a multipath signal;
   (b) correlating each of the plurality of received signals with delayed versions of a corresponding replica waveform to form a two dimensional matrix, where matrix elements in one dimension correspond to different time intervals;
   (c) estimating a frequency spectrum of the two dimensional matrix, wherein the estimating the frequency spectrum includes at least one of MUSIC, modified MUSIC, APES, maximum entropy methods, and subspace fitting methods; and
   (d) identifying, and separating out a signal path of the at least one line-of-sight signal and the at least one multipath signal from the spectrum by a value of phase rates associated with these paths.

2. The method of claim 1 wherein the line-of-sight path is a first arriving signal.

3. The method of claim 1 wherein the step of correlating uses multiple correlators.

4. The method of claim 1 wherein the user is moving relative to the transmitter, and a second dimension of the two dimensional matrix is delayed in time.

5. The method of claim 1 wherein the plurality of RF signals is comprised of transmissions in multiple frequency channels, and a second dimension of the two dimensional matrix corresponds to correlations with each corresponding replica waveform in different frequency channels comprising the signal.

6. The method of claim 1 wherein the plurality of signals and the corresponding replica waveforms are filtered prior to computing correlation, such that a spectrum of each is limited to a band within the original spectrum, and second dimension of the two dimensional matrix corresponds to different bands.

7. The method of claim 1 wherein the corresponding replicated waveforms and delay are based on an estimated location of the transmitter and an estimated time of transmission.

8. The method of claim 2 wherein a delay for the line-of-sight path is estimated by combining data from correlators at different replica delays using early-minus late power correlators.

9. The method of claim 7 wherein the estimated location is based on an inertial navigation system.

10. The method of claim 1 further comprising the step of adjusting the two dimensional matrix as a function of an estimated motion of the user.

11. The method of claim 10 wherein the step of adjusting the two dimension matrix includes rotating phases of correlation measurements by an amount consistent with the estimated user motion.

12. The method of claim 11 further comprising the step of identifying the line-of-sight path as a function of a smallest phase rate change.

13. The method of claim 2 further comprising the steps of:
(f) estimating a pseudorange (PR) delay and Doppler for the line-of-sight path for a plurality of transmitters; and
(g) estimating a position of the user as a function of the PR and Doppler measurements.

14. The method of claim 13 wherein the step of estimating the user position includes use of a Kalman filter.

15. The method of claim 1 wherein the step of estimating the frequency spectrum includes applying spectrum estimation-based beamforming and direction finding methods on data comprising temporal dimension of the two-dimensional matrix.

16. The method of claim 15 wherein the spectrum estimation based beamforming and direction finding methods include the steps of:
(i) identifying signal paths from data which are associated with at least one of replica delay, frequency channel, or spectral band;
(ii) computing beamforming weights for each signal path;
(iii) applying beamforming weights to data for at least one other of replica delays, frequency channels, or spectral bands;
(iv) estimating amplitudes, phase rates and residual delays of isolated signal paths; and
(v) identifying line-of-sight path as a function of at least one of the following criteria: smallest residual delay, smallest phase rates, and sufficiently large amplitude.

* * * * *